July 10, 1956  G. F. OAKLEY  2,753,816
ANCHORING DEVICES FOR LADING STRAPS AND THE LIKE
Filed Oct. 9, 1952  2 Sheets-Sheet 1
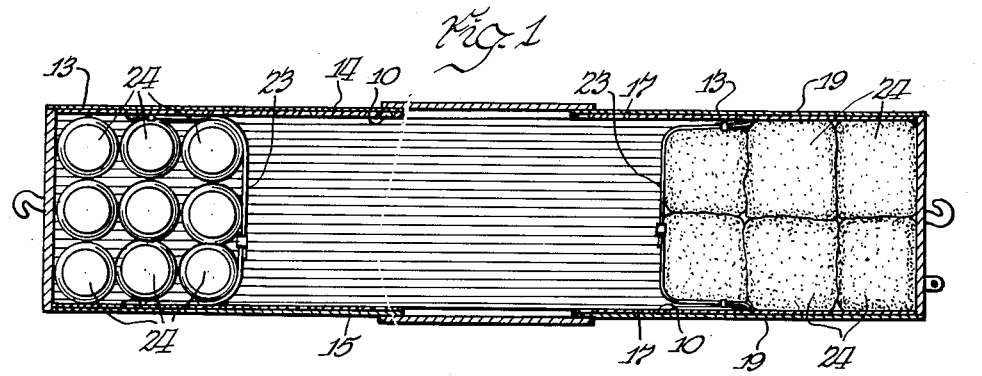
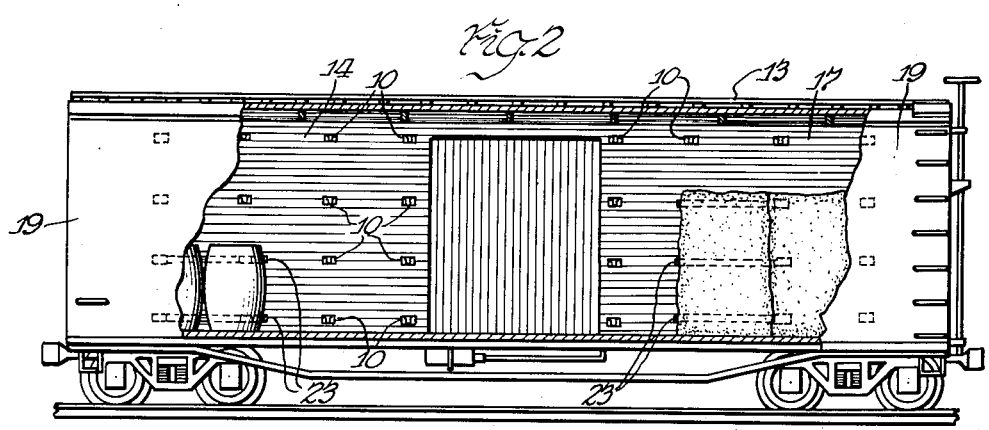
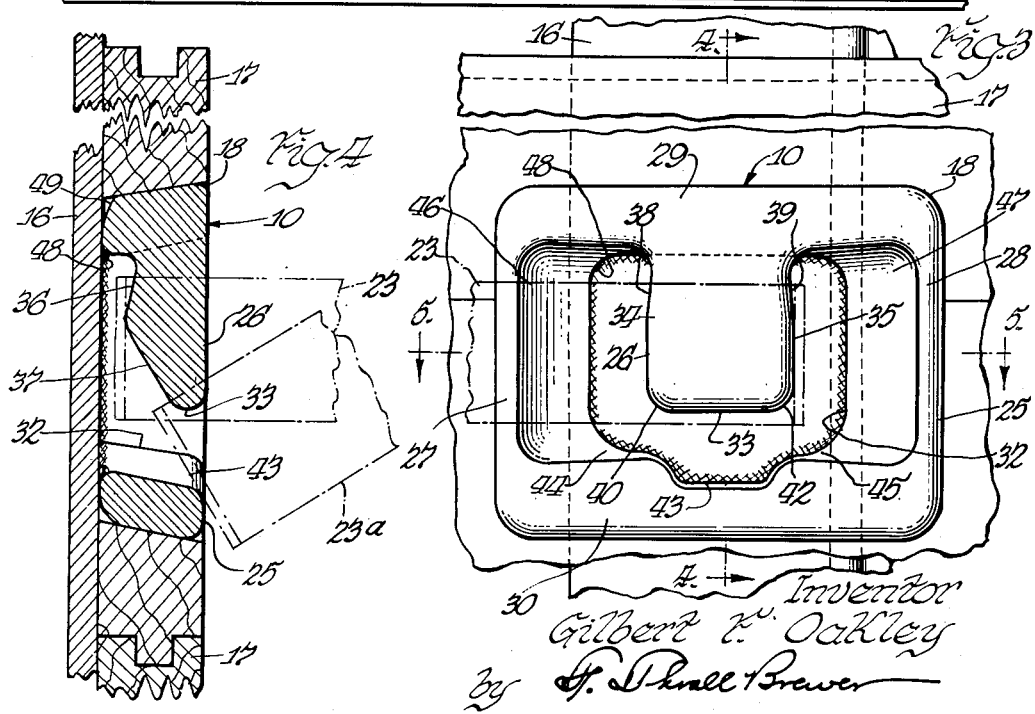
Inventor
Gilbert F. Oakley
by F. Purnell Brewer
Atty.

July 10, 1956  G. F. OAKLEY  2,753,816
ANCHORING DEVICES FOR LADING STRAPS AND THE LIKE
Filed Oct. 9, 1952  2 Sheets-Sheet 2
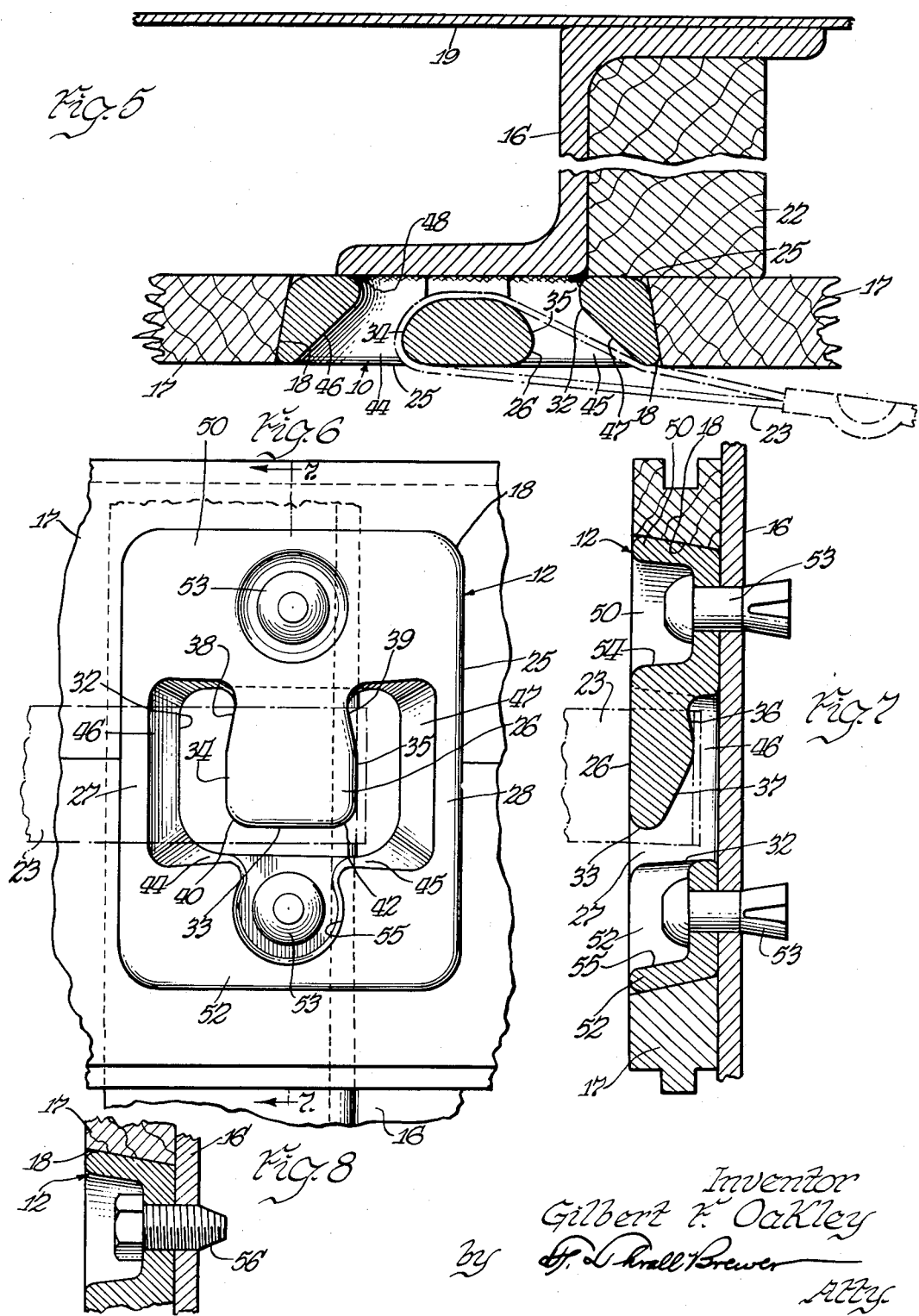
Inventor
Gilbert F. Oakley

United States Patent Office 2,753,816
Patented July 10, 1956

2,753,816

ANCHORING DEVICES FOR LADING STRAPS AND THE LIKE

Gilbert F. Oakley, Chicago, Ill., assignor to MacLean-Fogg Lock Nut Co., Chicago, Ill., a corporation of Illinois Application October 9, 1952, Serial No. 313,878

9 Claims. (Cl. 105—369)

This invention relates to anchoring devices to which lading straps and other cargo binding elements and the like may be secured, and more particularly to such devices which are adapted to installations for relatively permanent and repeated use in railway cars and other cargo carrying vehicles.

One of the objects of this invention is not only to provide anchoring devices adapted for installation and removal of lading straps and the like having looped end portions, but to provide such anchoring devices which positively hold the looped end of the strap in an anchored position during normal use for the retention of cargo.

It is another object of my invention to provide an anchoring device for lading straps which is constructed and arranged to minimize the possibility of tearing the strap at one of its anchored ends.

As another object, my invention comprehends the provision of a one piece lading strap anchor which is adapted to be manufactured in quantities as a forged or cast piece.

My invention further comprehends an anchoring device suited to use for securing and retaining the ends of wire cargo binding elements, as well as straps.

Another object of the invention is to provide anchoring devices adapted to be secured either by welding or by removable fastening elements to metal parts of the frame structure of railway cars and the like.

Pursuant to this invention, the structure and relationships of parts of my anchoring device are such that a tongue having a free end is carried by a supporting frame, and wherein the tongue and frame are constructed and related so that a looped end of a lading strap can be installed upon and removed from the tongue through the use of movements of the lading strap which force it through positions other than those assumed while in use for retaining lading in place, and wherein the frame and tongue serve positively to secure the anchored strap end in its cargo retaining position.

My disclosed anchoring device further has within its purview the provision of a unitary structure having integrally made tongue and supporting frame portions which, when mounted in my preferred manner, have exposed surfaces which are bevelled or tapered so as to avoid the collection of foreign matter therein.

In my disclosed anchoring device, I have also provided an aid for effecting removal of the anchoring device from the car structure, if such removal becomes necessary, in that I have provided a tapered rear surface adapted to afford space for a chisel or the like to be driven behind the device to effect the release of any securing structure.

Other objects and advantages of the invention will be apparent from the following description and the accompanying drawings in which similar characters of reference indicate similar parts throughout the several views.

Referring to the two sheets of drawings:

Fig. 1 is a longitudinal top sectional view illustrating a preferred adaptation of my invention and its use in connection with railway box cars and the like;

Fig. 2 is a side elevational view of a box car with a portion of the car structure broken away to further depict the adaptation and use illustrated in Fig. 1;

Fig. 3 is a front elevational view of a preferred form of my anchoring device showing a preferred manner of mounting the same in connection with structure which is indicated fragmentarily, and wherein a lading strap is depicted in its anchored position by dot and dash lines.

Fig. 4 is a side sectional view taken substantially on a line 4—4 of Fig. 3 and in the direction of the arrows, and wherein a lading strap is shown in its anchored position, as well as in a position through which it is passed for application to the anchoring device;

Fig. 5 is a top sectional view taken substantially on a line 5—5 of Fig. 3 and wherein a lading strap is indicated in its anchored position;

Fig. 6 is a front elevational view similar to Fig. 3, but depicting a modified form of my anchoring device;

Fig. 7 is a side sectional view taken substantially on a line 7—7 of Fig. 6 and in the direction of the accompanying arrows; and Fig. 8 is a fragmentary sectional view of a portion of the structure depicted in Fig. 7, but showing the use of a different type of fastening element for securing the anchoring device to a supporting structure.

Although anchoring devices 10 and 12 of the types illustrated herein are adapted to use on various types of cargo carrying vehicles, including motor trucks and ships, Figs. 1 and 2 are illustrative of a preferred adaptation and manner of use of my anchoring devices in connection with a railway box car 13. As there shown for illustrative purposes, the anchoring devices, such as 10, are mounted in vertically spaced relationship and in rows spaced longitudinally of side walls 14 and 15 of the box car. By preference, and in order to provide the desired strength and rigidity, the anchoring devices are secured to structural frame members of the car side walls, such as the metal Z-posts 16, as shown in Figs. 3, 5 and 6. When the anchoring devices are installed during the construction of a new car or the reconstruction of an old car, interior siding 17 may be cut so as to fit closely around the exteriors of the mounted anchoring devices, while in making installations in cars without removing the interior siding, suitable openings 18 may be cut in the siding at the Z-posts as, for example, with a routing tool. It is desirable, in any instance, to have the siding fit closely around the exteriors of the anchoring devices, so as to avoid the formation of pockets in which dirt and other material may collect.

When mounted as herein disclosed, the front surfaces of my anchoring devices are practically flush with the interior surface of the car siding. It may be observed that the mounting of my anchoring devices in the prescribed manner does not effect any change in the mounting or structure of the exterior side panels 19 of the car. Furthermore, the wood post, such as 22 (Fig. 5), which is utilized adjacent the metal Z-post in customary car structures, is useable for securely anchoring the interior car siding adjacent each anchoring device. Generally and preferably the anchoring devices are installed at positions such that no interior siding board is completely severed to accommodate the device.

In use, as depicted in Figs. 1 and 2, anchoring devices of the type herein disclosed are utilized for securely anchoring the ends of flexible cargo binding elements, such as steel strapping 23, in positions at required height and longitudinally of the vehicle for securing elements of cargo, such as 24, firmly in position during transit.

Although various types of flexible cargo binding elements are in use, wires and relatively flexible metal straps are among the forms in most common use at the present time. In either instance, the installation and removal of the flexible cargo binding elements or straps is considerably facilitated by having the ends thereof looped and having the loops secured therein prior to attachment to the anchoring devices, so that the loops may be formed and secured at convenient positions, and after which the looped straps or elements may be readily and conveniently slipped into their anchored positions relative to the anchoring devices and lading for which they have been preadjusted in length. It may be readily understood that the ends of used lading straps or elements can be readily and quickly removed after cutting or releasing the lading straps, so that they will not provide obstructions or hazards during later uses of the vehicle for different lading. Thus, the anchoring devices disclosed herein are particularly adapted to the use of such looped cargo binding elements and further to the maintenance of maximum strength in those elements during use and the secure anchoring of such looped cargo binding elements without presenting hazards resulting from the detachment of the cargo binding elements from the anchoring devices during use.

Having particular reference to the structural details of my exemplary anchoring devices 10, which are illustrated in Figs. 3, 4 and 5, they generally embody an outer frame portion 25 and a tongue portion 26, which tongue portion, in the present instance, is an integral portion of the unitary structure. The frame portion 25, in my disclosed structures, although it need not necessarily be, is generally rectangular in shape with opposed sides 27 and 28 integrally formed with opposed ends 29 and 30, so as to define an opening 32 in the mid-portion of the frame which extends from the front to the rear thereof. The tongue portion 26 is integral with and extends from the end 29 of the frame portion partially across the mid-portion of the opening 32, so that it has a free end 33 in opposed and spaced relationship to the end 30 of the frame portion. In the disclosed structure, the front of the tongue portion is substantially flush with the front surfaces of the sides and ends of the frame portion, and those parts present a substantially flat front surface. At the rear, however, the tongue portion 26 is spaced forwardly from the plane of the rear surface of the frame portion, so as to provide ample room for the accommodation of a flexible anchoring element, such as the lading strap 23, between the rear surface of the tongue portion and the rear surface of the frame portion.

In my disclosed anchoring devices various factors of importance enter into the structure, proportions, and contours of the tongue portion 26. For example, and as illustrated in Fig. 5, opposite side surfaces of the tongue portion 26 are rounded, so as to distribute stress in the looped end portion of a lading strap which is anchored thereto and quite regardless of the angle from which tension is applied through the anchored lading strap. In addition, and as depicted in Figs. 4 and 7, the rear surface of the tongue portion 26 is longitudinally contoured so as to provide rear surface portions 36 in obtuse angular relationship and joined by a rounded curve, whereby the sectional area of the tongue portion is larger at its mid-portion than at either of its ends, and as a result of which the tongue portion not only tends to retain wire cargo binding elements thereon near its inner end, but also effects greater stress in lading straps near the mid-portions of such straps, rather than at either or both outer edges thereof. Strap type cargo binding elements have a greater tendency to tear when the maximum stress occurs at the outer side edges than when the maximum stress is exerted inwardly from those side edges. As shown in Figs. 3 and 6, inner end portions 38 and 39 at opposite sides of the tongue portion converge toward one another and corners 40 and 42 at the free end of the tongue portion are rounded in order further to avoid overstressing of the side edges of lading strap when it is applied to the anchoring device so as to have the tension applied at an angle laterally of the anchoring device and to either side thereof. Between the converging side portions 38 and 39 and the rounded corners 40 and 42, the sides of the tongue portion are relatively straight and substantially parallel so as to provide substantial bearing surface for a strap type cargo binding element when mounted to pull toward either side of the anchoring device. In proportions, the tongue portions of my disclosed anchoring devices are practically as wide as they are long. This provides the necessary strength and rigidity and takes into account the fact that lading is generally secured so that the tension in the strap is applied in an angular direction extending laterally of the tongue portion.

Strap type cargo binding elements in general use are usually made in certain standard widths. While my anchoring devices are not at all limited to the use of standard widths of lading straps, certain considerations have been given to the usual and standard widths of straps in the design of anchoring devices adapted to use with straps of those widths. For example, the height of the opening 32 is greater than the width of a lading strap with which the anchoring device is intended to be used. Also, the length and proportions of the tongue portion are such that ample bearing surface is provided for the strap when it is disposed in the mid-portion of the opening. Furthermore, with a strap disposed in the mid-portion of the opening and extending therefrom, it is preferred that the strap shall extend across the rounded corners 40 and 42 and along the converging side portions 38 and 39 of the tongue, so as to avoid the maximum stressing of the strap at its outer edges.

Other factors affect the contours and proportions of parts, as well as the spacing of the free end of the tongue portion from the opposed end of the frame portion. On the other hand, it is necessary to provide for the convenient and quick installation of a pre-looped lading strap across the end and over the tongue portion without undue interference from the end of the frame portion. As a result of this construction and so as to provide surfaces which will act as stops for limiting movements of the strap longitudinally of the tongue portion, I have provided a recess 43 in the end 30 of the frame which is opposed to the mid-portion of the free end of the tongue portion, and which recess is nearly as wide as the tongue portion, so that it provides ample room for passing the looped end of the lading strap angularly across and behind the tongue portion, as depicted at 23a in Fig. 4. The required angularity of the strap in passing through the recess and into the opening is not sufficient to provide particular difficulty in either installing or removing the strap from the tongue. It does, however, provide a prescribed and orderly set of movements to be followed for effecting the installation and removal of a strap from the anchoring device, which prescribed set of movements differs from those which could be effected by gravitational force or the pull on the strap during use. With this structure, portions 44 and 45 on opposite sides of the recess 43 and opposed to the free end of the tongue portion serve as positive stops for preventing the direct movement of a lading strap from the tongue portion.

The surfaces facing the opening 32 converge forwardly, so as to avoid the collection of material, such as small grain, within the cavity of the anchoring devices. Further than this, the openings 32 of my disclosed anchoring devices are elongated and have end surfaces 46 and 47 which diverge widely toward the front, so as to provide internally bevelled ends which face forwardly and toward the tongue portion and are sufficiently spaced from the tongue portion at the front, so that sharp angles in the anchored lading strap are avoided, even when the looped strap engages the side of the anchoring device, as shown in Fig. 5. It may be observed that the structure of my anchoring device contemplates wider spacing between the side surfaces of the opening than between the free end of the tongue and the opposed end of the opening, because the end surfaces of the opening are utilized to confine the anchored lading strap between extreme limits of movement, while the side surfaces are spaced therefrom to avoid the necessity of abrupt or relatively sharp bends in a flexible cargo binding element.

In the mounting of the disclosed anchoring device, the frame portion 25 serves as a support and stress distributing structure by which forces from the anchored lading strap are transmitted through the device to the frame structure of the car upon which it is used. In the form of my anchoring device depicted in Figs. 3, 4 and 5, the device is secured to the Z-post 16 by a welded seam 48 extending peripherally of the opening 32 and along the adjacent surface portions of the frame and Z-post. This portion of the surfaces is accessible for welding through the opening 32 from the front of the anchoring device. In the event that removal of the anchoring device becomes necessary in making changes or repairs, I have provided a bevelled surface portion 49 (Fig. 4) at the outer margin of one end surface and at the rear of the anchoring device, which bevelled surface portion provides a space into which the end of a cold chisel or like tool may be driven to effect rupture of the welded seam.

Although seemingly contrary to previous practice, my anchoring devices are shown mounted in positions such that the free ends of the tongues face downwardly. The discussed provisions which have been made for holding a flexible tying element in place and preventing dislodgment of the tying element from the tongue during use make this practice not only feasible, but desirable, because in most instances it is easier to effect the anchoring engagement of the prelooped end of a lading strap or the like with the tongue when the tongue extends downwardly, rather than upwardly. Furthermore, it has been found that during installation of lading straps, engagement of a looped end of such strap with the depending tongue of an anchoring device, the top wall of the device and the surface of the Z-post very materially limits sagging of the strap while the other strap end is being anchored.

The form of my anchoring device which is depicted in Figs. 6 and 7 is modified from that shown in Figs. 3, 4 and 5 to the extent that the ends of the frame portion are made wider, so as to accommodate removable fastening elements 53 for securing the device to the frame structuer of a car, instead of supporting it by a welded seam. The fastening elements 53 are of the blind riveted type. A recess 54 is provided in one end of the frame portion for accommodating the head of one rivet, while a recess 55 is opposed to the free end of the tongue portion, and serves both to accommodate the head of the fastening element 53 and to provide space for passing a looped lading strap into engagement with the tongue portion. This type of mounting is favored when consideration is given to ease of removal, or when it is desired that the anchoring device may have a limit of stress at which it will become released from the car frame structure.

In the modified structure which is illustrated in Fig. 8, the anchoring device is generally like that shown in Figs. 6 and 7, but removable fastening elements in the form of self-tapping screws 56 are utilized for securing the anchoring device to the car frame.

It is pointed out that from the standpoint of fabrication or manufacturing, the disclosed anchoring devices are not only unitary structures which are subject to ease of handling and mounting, but that the relationships and structures of the various portions are such that they are readily subject to being made by either casting or forging, and when made in either way, the necessary additional finishing operations are relatively inconsequential.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. An anchoring device for lading straps and the like and constituting a unitary one piece structure which comprises, in combination, tongue and frame portions disposed between planes defined by front and rear surfaces of the frame portion, said frame being generally rectangular in shape, said frame also having an opening in the mid-portion thereof which extends therethrough from front to rear and which is laterally elongated at the front with bevelled side surfaces facing forwardly, said tongue portion projecting partially across said opening from one end of the frame portion and substantially midway between said side surfaces so as to have a free end spaced from the other end of the frame portion, said tongue portion having a front surface flush with the plane of the front surface of the frame portion and a plurality of angularly disposed rear surface portions spaced from the plane of the rear surface of the frame portion and providing a rear bulge at the mid-portion of the tongue portion, said tongue portion also having rounded corners and side surfaces which are substantially parallel near the free end thereof, and the ends of the frame portion having surfaces facing said opening opposite the free end of the tongue portion and adjacent opposite sides of the other end of the tongue portion which diverge toward the front plane of the frame portions at angles less than those of said bevelled side surfaces.

2. An anchoring device for lading straps and the like as defined in claim 1, and wherein a recess narrower than the tongue portion is provided in one end of the frame portion opposite the free end of the tongue portion.

3. An anchoring device for lading straps and the like as defined in claim 1, and wherein the contours of the tongue portion are such that its cross-sectional area at the mid-portion thereof between its ends is greater than the cross-sectional area thereof near either end.

4. An anchoring device for lading straps and the like as defined in claim 1, and wherein the rear and side surface portions of the tongue portion have both laterally and longitudinally varied contours providing the rear bulge at the mid-portion which stresses a looped end of a lading strap having a width approximately equal to the length of the tongue portion and placed over the tongue portion so as to engage either side of the frame portion more at the mid-portion of the strap at either edge thereof when tension is applied to the strap.

5. An anchoring device adapted to the installation, retention and removal of lading straps of approximately a predetermined width and having a formed and secured loop at the end thereof, said anchoring device comprising integral frame and tongue portions so constructed and arranged that the frame portion defines an opening extending therethrough from front to rear at the mid-portion thereof and the tongue portion extends partially across the opening from one end of the frame in spaced relationship to the rear of the frame and so as to have a free end near the other end of the frame, said opening being wider than the tongue portion and being defined at its opposite sides by bevelled side faces on the frame portion facing angularly toward the front of the frame and the opposite sides of the tongue, the length of the tongue portion being somewhat less than said predetermined strap width and the distance across the opening longitudinally of the tongue portion being somewhat greater than said predetermined strap width, and the longitudinal rear surface contours of the tongue portion providing a bulge at the rear of the tongue portion disposed at a distance from said ends in a direction longitudinally of said tongue portion less than the width of said strap so that a looped strap of said predetermined width encompassing the tongue portion and extending into said opening between the ends of the frame is stressed more near the mid-portion of the strap width than at either edge thereof when tension is applied to the strap.

6. An anchoring device as defined in claim 5, and wherein the end of the frame portion opposite the free end of the tongue portion has a recess therein which is narrower than the tongue portion, and the rear of the tongue portion is tapered rearwardly away from the recessed end of the frame so that the free end of the tongue portion is reduced in thickness toward the recess and from the bulge, thereby to facilitate application of the looped lading strap to the tongue portion through the recess and through positions angular to the tongue portion to effect engagement of the tongue portion in the strap loop and extension of the strap into the opening.

7. An anchoring device for lading straps and the like comprising, in combination, tongue and frame portions, said frame portion having front and rear planes and defining an opening extending therethrough from front to rear, said tongue portion having one end secured to the frame portion and extending partially across the mid-portion of the opening with its other end free and spaced from the frame portion, said tongue portion having its rear surface spaced from the rear plane of the frame portion, and said tongue portion also having longitudinally parallel side surface portions and a bulge at the mid-portion of the rear surface thereof to provide a portion of maximum lateral sectional area near the longitudinal mid-portion of the tongue portion for engagement with a lading strap.

8. An anchoring device for lading straps and the like as defined in claim 7, and wherein the frame portion has surface portions relatively close and in opposed relationship to the free end of the tongue portion, and the frame portion has a recess therein opposite the mid-portion of the free end of the tongue portion which is narrower than the tongue portion and through which a lading strap can be passed angularly into the opening and behind the tongue portion to a position in which it engages the tongue portion and said surface portions of the frame portion.

9. An anchoring device for lading straps and the like comprising, in combination, tongue and frame portions, said frame portion having front and rear planes and defining an opening extending therethrough from front to rear, said tongue portion having one end secured to the frame portion and extending partially across the mid-portion of the opening with its other end free and spaced from the frame portion, said tongue portion having its rear surface spaced from the rear plane of the frame portion, said frame portion and the free end of the tongue portion being relatively close together and opposed, and the frame portion having a recess therein opposite the mid-portion of the free end of the tongue portion which is narrower than the width of the tongue portion and provides space for the passage of a bent lading strap angularly across the free end of the tongue portion to a position behind the tongue portion and extending laterally of the tongue portion in said opening, said frame portion also having surfaces at opposite sides of the recess for supporting the bent lading strap anchor in a position behind the tongue portion.

References Cited in the file of this patent

UNITED STATES PATENTS

| | | |
|---|---|---|
| 1,920,917 | Scales | Aug. 1, 1933 |
| 2,046,855 | Tobin | July 7, 1936 |
| 2,051,381 | Kivlin | Aug. 18, 1936 |
| 2,441,336 | Sova | May 11, 1948 |
| 2,623,477 | Tuttle | Dec. 30, 1952 |